United States Patent [19]

Madeley

[11] 4,259,563
[45] Mar. 31, 1981

[54] METHOD FOR DYNAMICALLY TUNING A SEISMIC TRANSDUCER

[75] Inventor: Paul E. Madeley, Houston, Tex.

[73] Assignee: Litton Resources Systems, Inc., Houston, Tex.

[21] Appl. No.: 21,415

[22] Filed: Mar. 19, 1979

[51] Int. Cl.³ .................. B23K 26/10; B23K 26/08
[52] U.S. Cl. .................. 219/121 LJ; 219/121 LB; 219/121 LW; 29/593
[58] Field of Search .... 219/121 L, 121 LM, 121 LH, 219/121 LJ, 121 LX, 121 LB; 29/593

[56] References Cited

U.S. PATENT DOCUMENTS

| | | | |
|---|---|---|---|
| 2,939,079 | 5/1960 | Willmore | 324/158 R |
| 3,766,616 | 10/1973 | Staudte | 219/121 LM X |
| 3,833,999 | 9/1974 | Budych et al. | 219/121 LM X |
| 4,017,965 | 4/1977 | Brutsch et al. | 219/121 LM X |
| 4,131,484 | 12/1978 | Caruso et al. | 219/121 LM X |
| 4,154,530 | 5/1979 | Connolly, Jr. et al. | 219/121 LX |
| 4,184,062 | 1/1980 | Schmidt | 29/593 X |

FOREIGN PATENT DOCUMENTS 2460230  6/1976  Fed. Rep. of Germany ............. 29/593
2713904 10/1978  Fed. Rep. of Germany ... 219/121 LM
588565   1/1978  U.S.S.R. ................................. 29/593

OTHER PUBLICATIONS

*Western Electric Technical Digest*, No. 29, Jan. 1973, pp. 7-8, "Control of Laser Trimming of a Thin-Film Phase-Shifting Circuit," by F. M. Barlage.

Primary Examiner—Elliot Goldberg
Assistant Examiner—Keith E. George
Attorney, Agent, or Firm—William A. Knox

[57] ABSTRACT

A spring-suspended, moving-coil transducer to be tuned is mounted on a dynamic test fixture and excited by an oscillatory driving force calculated to drive the transducer at a desired resonant frequency. A laser beam, sensitive to a difference between the actual resonant frequency of the transducer and the desired resonant frequency, is focused on the spring. The energy of the laser beam alters the elastic constant of the spring by trimming or etching material therefrom until the difference between the actual resonant frequency of the transducer and the desired resonant frequency is eliminated.

4 Claims, 3 Drawing Figures

METHOD FOR DYNAMICALLY TUNING A SEISMIC TRANSDUCER

BACKGROUND OF THE INVENTION

1. Field of the Invention

This invention relates to a method for dynamically tuning seismic transducers to a specified resonant frequency.

2. Description of the Prior Art

One type of motion-sensing transducers utilizes a spring-suspended, moving coil assembly wherein the spring and coil assembly oscillate at a desired resonant frequency. In order to maintain consistent transient response among many such transducers, commercial standards require that the actual resonant frequency of each transducer must fall within ±5% of the desired resonant frequency, particularly for digital grade geophones used in geophysical exploration.

Under conventional manufacturing techniques, springs and coil assemblies are mass produced. However, due to limitations inherent in the production process, the springs and coil assemblies cannot be manufactured so perfectly that a randomly-chosen spring can be combined with a randomly-selected coil assembly to produce a transducer with a resonant frequency within the commercially acceptable tolerance range. The springs and coil assemblies must therefore be sorted to match a spring that is out of tolerance in one direction with a coil assembly that is out of tolerance in another direction so that the combination of the two produces a transducer with the desired resonant frequency. The procedure of selective matching of springs and coil assemblies is necessarily a hand operation that is time consuming and costly. Additionally, there is an inherent limit to the degree of spring and coil assembly mismatch that can be tolerated.

SUMMARY OF THE INVENTION

It is an object of this invention to provide a method for dynamically tuning a seismic transducer to a desired resonant frequency by symmetrically etching or trimming the spring of the transducer by means of a laser beam while the transducer is excited. Alternately, the coil bobbin can be so trimmed.

In a preferred embodiment of the invention, the transducer to be tested is mounted in a test jig. A constant-current oscillator calculated to drive the spring and coil assembly at a desired resonant frequency, is connected to the transducer coil. Any deviation from the desired resonant frequency resulting from an imperfect match between the spring and coil assembly is monitored by observing the phase difference between the driving current across the oscillator and the voltage induced across the transducer coil. The transducer is considered to be properly tuned when the phase difference is reduced below a preselected value. Alternatively, the transducer under test may be driven by a shaking table.

The spring and coil assembly of the transducer is tuned to the desired resonant frequency by focusing a laser beam on the spring while the transducer is excited. Directed at the spring by means of optical beam-position controls, the laser beam modifies the elastic constant of the spring by symmetrically etching the thickness of or by trimming the width of the spring. As spring trimming continues, the phase difference between the driving signal and the induced signal diminishes as the transducer response approaches the desired resonant frequency.

In accordance with another aspect of this invention, the laser light source is controlled automatically by means of a phase-sensitive controller.

In accordance with yet another aspect of this invention, the transducer is tuned to the desired resonant frequency by reducing the mass of the coil assembly by laser etching.

BRIEF DESCRIPTION OF THE DRAWINGS

These and other advantages and objectives of this invention will be better understood from the attached description and the drawings wherein.

DETAILED DESCRIPTION OF THE PREFERRED EMBODIMENT

Figure 1:
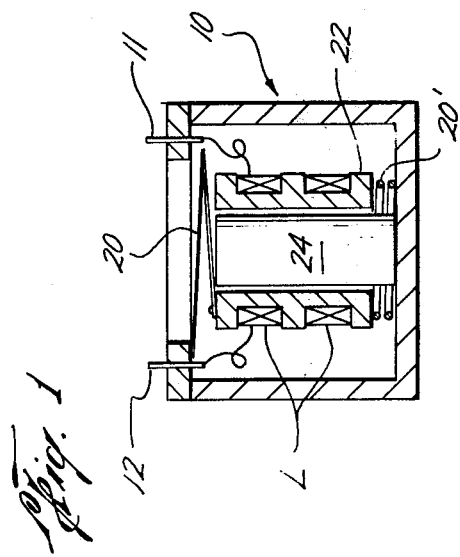
FIG. 1 is a simplified cutaway view of a typical spring suspended, moving coil transducer.

FIG. 1 shows a simplified cutaway of a typical spring suspended, moving coil transducer 10. The moving coil assembly for such a transducer consists of a bobbin 22 having one or more coils L of fine wire wound thereon. Bobbin 22 and wire coil L, which together form a mass, are suspended by springs 20, 20' for motion relative to the magnetic field of a permanent magnet 24. As shown, spring 20 is a flat spring while spring 20' may be helical.

Figure 2:
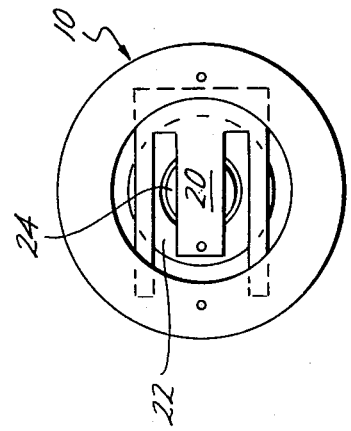
FIG. 2 is a top view of the same transducer showing the spring.

FIG. 2 is a top view of the transducer with spring 20 exposed. The spring configuration shown in FIGS. 1 and 2 is for illustrative purposes only since the invention can be used to etch or trim any type of spring configuration.

Figure 3:
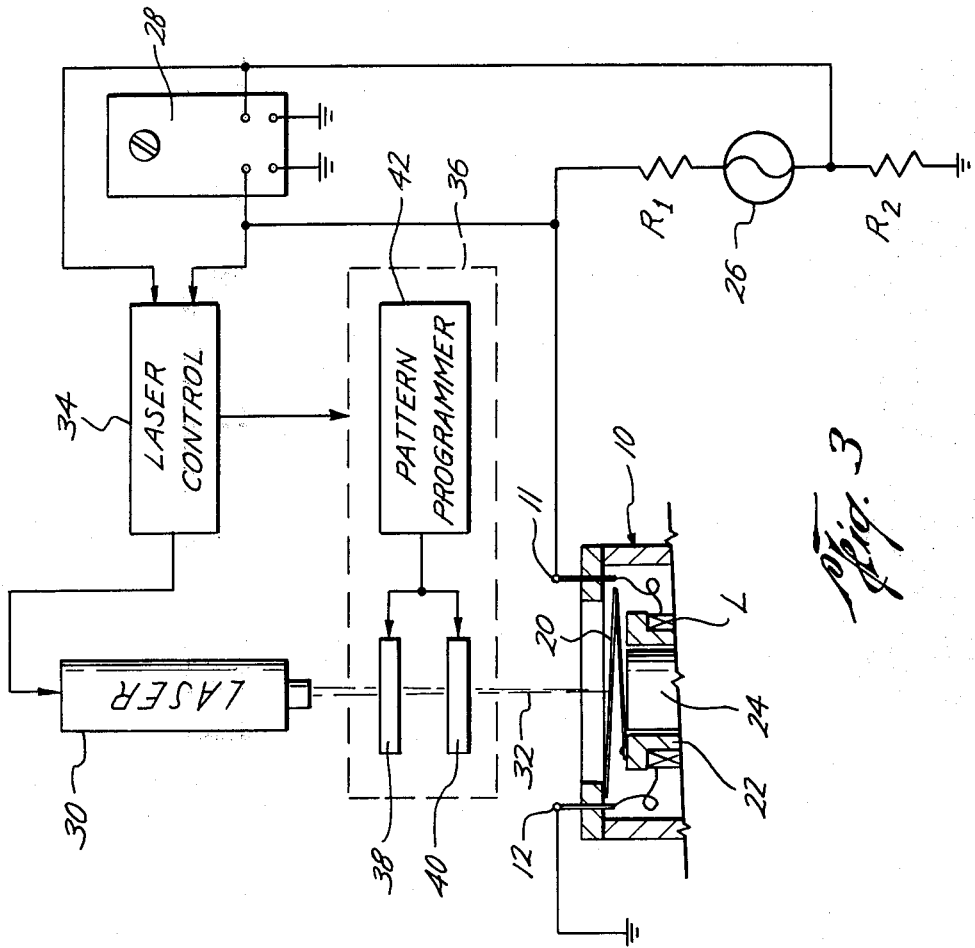
FIG. 3 illustrates schematically a transducer under test wherein the spring is etched by a laser that is sensitive to the phase difference between the driving current and the voltage induced across the transducer coil.

Referring now to FIG. 3, coil L of a transducer 10 under test, is connected via terminals 11, 12 to a constant-current oscillator 26 which drives transducer 10 at a desired resonant frequency. Resistors $R_1$ and $R_2$ are chosen so that $R_1 >> R_2$. The output of the constant current oscillator 26 is a sinusoidal signal set to a frequency equal to the desired transducer resonant frequency. The driving current drives the spring and coil assembly of transducer 10 at a frequency close to the desired resonant frequency. The difference between the actual and the desired resonant frequencies is assumed to be a function of a mismatch of the elastic constant of springs 20, 20' relative to the combined mass of coil L and bobbin 22.

When driven by constant current oscillator 26, coil L develops a back emf. Since the impedance of coil L is much lower than the impedance of constant current oscillator 26, the back emf is the dominant voltage across coil L. Accordingly, the phase difference between the driving current and the back emf induced in the coil can be monitored by connecting an oscilloscope 28 as shown in FIG. 3. The two voltages are connected respectively to the vertical and horizontal beam deflection plates of the oscilliscope to form a well known Lissajous pattern on the screen. The Lissajous pattern indicates the phase difference between the two voltages. The transducer is properly tuned to a desired resonant frequency when there is no substantial phase difference between the driving voltage across oscillator 26 and the signal induced across coil L of the transducer. The oscilloscope may be used for visual monitoring when used with a laser spring-trimming device, next to be described.

Referring again to FIG. 3, a laser device 30 is provided. The beam 32 from laser 30 is focused upon spring 20 of the transducer under adjustment. A laser controller 34, acting as a phase-sensitive laser controller, is connected in parallel to the oscilloscope inputs. When the driving and induced signals are out of phase, as detected by laser controller 34, the laser light source 30 is triggered and laser beam 32 is emitted to etch or trim spring 20. The position of the laser beam relative to spring 20 is controlled by means of a laser beam position control system 36, which, in cooperation with laser controller 34, causes laser beam 32 to scan spring 20 in two dimensions and produces the desired etching or trimming movement on spring 20. One type of a commercial beam-position control utilizes a two-axis, high speed, closed loop galvanometer optical arrangement such as the 1080 Laser Trimmer System, manufactured by Quantrad Corporation, of Torrance, CA. Any other method for controlling the position of beam 32 relative to spring 20 could be used. An X galvanometer 38 and a Y galvanometer 40 are programmed to follow a desired pattern by means of a pattern-defining circuit 42 to produce the desired movement of the laser beam 32 relative to spring 20.

The movement of the laser beam 32 relative to spring 20 depends upon two variables: (1) the configuration of the spring 20 and (2) the desired method of trimming spring 20. Laser beam 32 may be used to either etch the surface of spring 20 or it may be used to trim the edges thereof. Either method serves to adjust the spring elastic constant to a desired value so long as the modification to spring 20 is symmetrically implemented.

The slew rate of the laser beam positioning system 36 is very fast, up to 50 inches per second; the resolution of the positioning system is 0.0005 inch. Accordingly it is practical to make several passes over the spring, trimming a minimal amount of material at each pass, allowing very fine tuning of the spring constant. In operation, laser beam positioning system 36 would continue to make trimming or etching passes over spring 20 so long as laser controller 34 indicates an out-of-phase condition between the driving current and the back emf of the coil. Spring-constant modification ceases when the phase difference, as sensed by laser controller 34 is reduced to a preselected level which may be zero degrees.

Trimming of spring 20 tends to lower the resonant frequency of the spring and coil assembly. Therefore, the spring etching or trimming process inherently involves starting with a transducer assembly whose resonant frequency is slightly above the desired resonant frequency.

In an analogous manner, bobbin 22 of the coil assembly can be trimmed or etched to reduce the mass of the system. Mass reduction tends to increase the resonant frequency. Hence, for a spring-mass system having a lower-than-desired resonant frequency, it is prudent to trim the mass.

Although the preferred embodiment shown in FIG. 3 employs an automatic trimming system, manual implementation could be established by disengaging phase-sensitive laser controller 34 and operating positioning controls 36 manually, referring to oscilloscope 28 for visual monitoring.

Thus, I have disclosed a means for producing motion sensitive transducers whose resonant frequencies match within a desired tolerance. Use of automatic laser trimming precludes the need for expensive hand-matching of springs and coil assemblies.

The method of this invention has been described in terms of exciting the moving coil by means of a driving force represented by an external AC signal. It is of course, possible to drive the transducer mechanically, using a shaking table of any well known type. A phase comparison would then be made between the output of the transducer under test and the output of a laboratory standard transducer colocated on the shaking table.

I claim as my invention:

1. In a method for dynamically tuning the resonant frequency of a moving-coil motion transducer having a coil-supporting bobbin and a bobbin-suspending spring, exciting the transducer by applying an oscillatory driving signal to the coil, the signal having a frequency equal to a desired resonant frequency and monitoring the phase difference between the driving signal and the back emf induced in the coil, the improvement comprising the steps of:
   directing a laser beam to continuously scan the bobbin-suspending spring to modify the elastic constant of the spring until the phase difference is reduced to a predetermined level.

2. The method as defined in claim 1 wherein the step of spring-constant modification includes spring-suspension edge trimming by said laser.

3. The method as defined in claim 1 wherein the step of spring constant modification includes spring-suspension surface etching by said laser.

4. In a method for dynamically modifying the resonant frequency of a moving-coil motion transducer comprising a two-element spring-mass system, applying a driving signal to the coil of the system and monitoring the phase difference between the driving signal and the back emf induced in the coil that is representative of the response of the system, the improvement comprising the step of:
   continuously trimming, by two-dimensional laser scanning, an element of the system in response to the phase difference.

* * * * *